Patented July 13, 1943

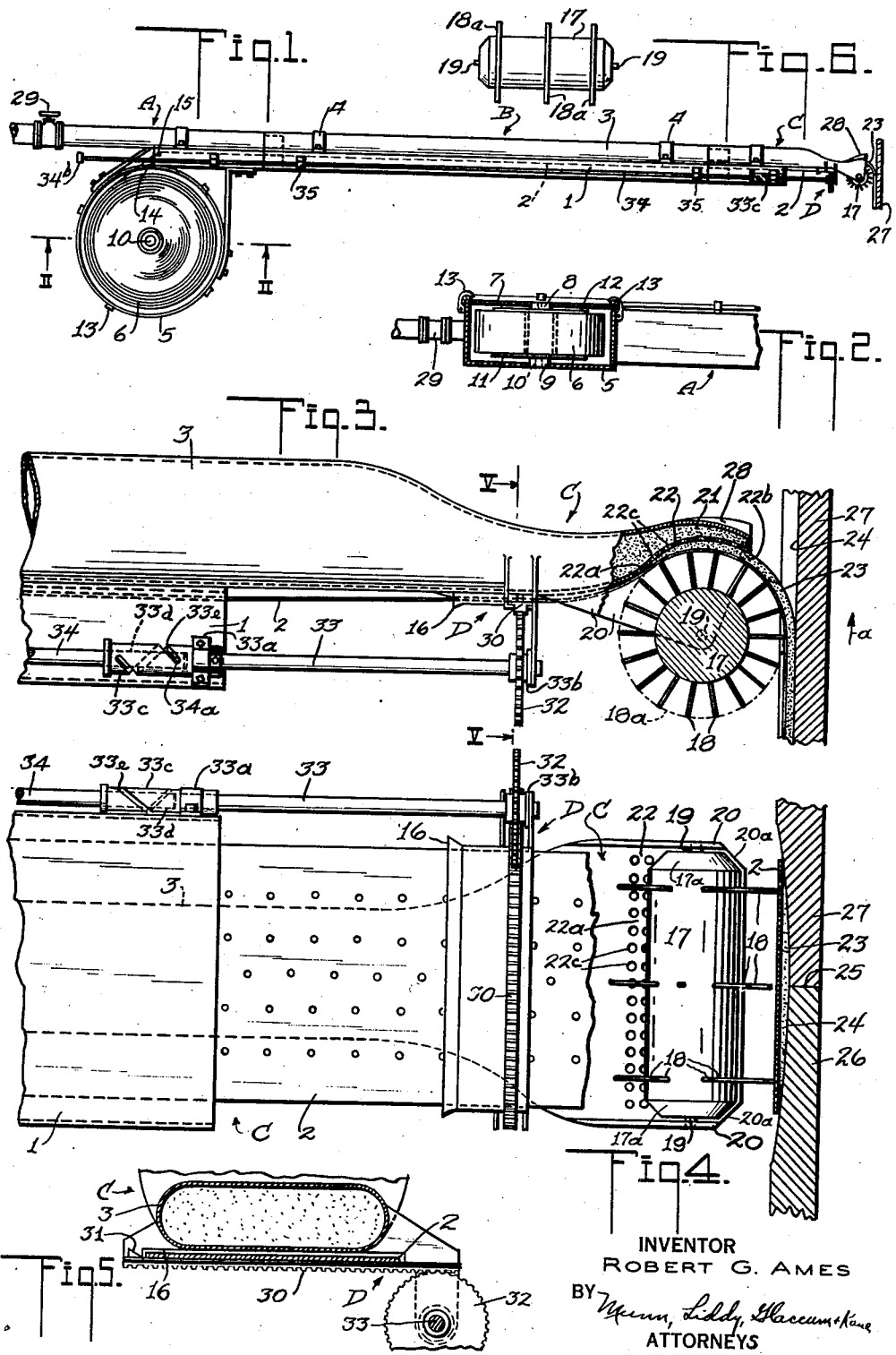

2,323,963

UNITED STATES PATENT OFFICE 2,323,963

COMBINED PLASTIC AND TAPE APPLICATOR

Robert G. Ames, Burlingame, Calif., assignor of one-half to George W. Williams, Burlingame, Calif.

Application August 11, 1941, Serial No. 406,339

23 Claims. (Cl. 216—22)

The present invention relates to improvements in a Combined plastic and tape applicator, and it consists of the combinations, constructions and arrangements hereinafter described and claimed.

Wall board takes the place of lath in many cases and in order to make a smooth joining between adjacent wall board sections the boards have recesses adjacent to their edges so that a joining of two wall board sections will form a shallow groove. Plastic is applied in the groove to partially fill it and then a tape is used to cover the plastic for reinforcing purposes. Up to this point, two operations are required, one to apply the plastic and the second, to apply the tape. Finally the tape is covered with another layer of plastic material whose outer surface is given a slight crown effect, the edges of the plastic merging into the wall board outer surface. Three operations are therefore necessary to ready the wall board for receiving wall paper or the like. In certain kinds of wall board, no groove is formed at the joining of adjacent sections.

The principal object of my invention is to provide a combined plastic and tape applicator which will combine the first two above operations into one by first coating the tape with plastic and then applying it to the joint between two adjacent wall board sections. This method of application not only combines two of the steps above-mentioned into one, but provides a more even distribution of the plastic that lies between the tape and the wall board, thus increasing the adhesive contact between the plastic and the wall board and thereby strengthening the entire joint. The device also has novel means for severing the tape at any desired point and in this way the operator can apply the plastic and tape along wall board joints of different lengths. The device is made up of sections so that it may be altered in length. The device is elongated to permit an operator to fill a ceiling joint while standing on the floor and is shortened to permit the filling of joints which are more accessible.

Novel means is provided for applying the tape and plastic material to the joint with a roller that will contact with the tape at spaced points or along a line and thus eliminate any tendency of the cylindrical roller surface forcing the plastic material out from under the tape. The tool is also designed to be used in different angular positions and to feed a ribbon of plastic material of the desired thickness and width to the tape at all times regardless of the tool's position.

The device is simple in construction and can be handled by one operator. The valve for controlling the flow of plastic material and the handle for actuating the tape-cutting means are positioned near each other so that they may be operated by one hand of the operator.

Other objects and advantages will appear in the following specification, and the novel features of the device will be particularly pointed out in the appended claims.

My invention is illustrated in the accompanying drawing forming a part of this application, in which:

Figure 1 is a side elevation of the entire device shown on a reduced scale and with the cover of the tape roll magazine removed;

Figure 2 is a section along the line II—II of Figure 1;

Figure 3 is a side elevation of the tape and plastic applying end of the tool shown at full size, a portion being illustrated in section for clarity;

Figure 4 is a bottom plan view of Figure 3 with parts broken away;

Figure 5 is a section along the line V—V of Figure 3,

Figure 6 is a plan view of a modified form of roller.

While I have shown only the preferred form of my invention, it should be understood that various changes or modifications may be made within the scope of the appended claims without departing from the spirit of the invention.

In carrying out my invention, I provide an elongated tubular neck 1 for carrying a perforated tape 2, and a tube 3 is secured to the neck 1 by clamps 4 and is adapted to convey a plastic material known in the trade as "mud." Both the neck 1 and the tube 3 are formed in sections designated at A, B, and C, these sections being removably connected together in order to vary the overall length of the tool as desired. The neck 1 carries a magazine 5 in which a roll 6 of the tape 2 is rotatably mounted. It is necessary that the roll revolve freely in the magazine so that the tape can be fed therefrom with practically no resistance. It is further essential that the roll be held against lateral movement in the magazine when the magazine is tilted into various angular positions during the use of the tool. This will prevent the sides of the tape roll from dragging on the inner side surfaces of the magazine.

In Figure 2, I illustrate the magazine 5 as having a removable cover 7 and this cover carries a thrust ball bearing 8 which cooperates with a thrust ball bearing 9 carried by the magazine casing 5 for rotatably receiving a shaft 10 that supports the roll of tape 6. The shaft has an integral flange 11 that contacts with one side of the tape roll and a removable disc 12 contacts with the other side. In this way the roll of tape is free to rotate within the magazine and yet is held centered and is prevented from lateral movement even though the roller axis is swung into a vertical position. The cover 7 is removably secured to the magazine casing by clamps 13 or other suitable fastening means.

The tape is passed through a slot 14 in the magazine and thence over a roller 15 that is mounted in the adjacent end of the neck 1. The tape extends entirely through the neck and then is passed through a guide casing 16 of a cutting mechanism indicated generally at D. The cutting mechanism will be described more fully hereinafter. The tape then passes over a roller 17 that has a plurality of pins 18 projecting radially therefrom. In the present form of the device, I have shown three annular rows of pins of nine pins each, and the pins in the center annular row are staggered with respect to those in the end rows. The purpose of this will be more fully explained hereinafter.

Figure 3 shows the tape passing around a portion of the roller and contacting with the ends of the pins 18 of this portion. The roller is rotatably carried at 19 by wings 20 that in turn are carried by the nozzle end C of the tube 3. The tube through the greater portion of its length is cylindrical and at the nozzle end the tube is flattened and widened in the manner shown in Figures 3 and 4. The interior portion 21 of the nozzle is made shallow so as to support the mud across the entire width of the nozzle even though the roller axis 19 is swung into a vertical plane. The portion of the nozzle adjacent to the roller is curved in the manner shown at 22 so that the part 22a is so close to the ends of the pins 18 as to permit only the passage of the tape 12 therebetween, while the portion 22b is spaced a sufficient distance from the roller periphery as to determine the thickness of the layer 23 of mud applied to the tape. The portion 22 is perforated at 22c and the perforations are arranged to cooperate with the curvature of the portion 22 to cause the mud to issue in a direction which will tend to rotate the roller in a direction to aid in withdrawing the tape from the roll of tape. This particular arrangement results in a more easy operation of the device.

I have found from actual practice that it is advisable to cause the tape to initially contact with the portion 22a of the nozzle in order to first become moistened and thus cause the plastic material to adhere to the tape. The plastic material or mud as it issues from the openings 22c will tend to rotate the roller in a clockwise direction when looking at Figure 3, and a uniform layer of mud will be applied to the tape just prior to the tape and mud being directed into a groove 24 formed adjacent to a wall board joint 25. The joint 25 lies between two adjacent pieces 26 and 27 of wall board, see Figures 3 and 4. A center guide or marker 28 is provided at the top of the nozzle and when the operator moves the tool along the groove, he can correctly guide the device by keeping the marker 28 aligned with the joint 25 at all times. This will cause the tape 2 to be bisected by the joint.

The mud is delivered under pressure of about forty pounds to the tube 3 from any source, not shown, and a valve 29 controls the flow of mud to the nozzle. The pressure of about forty pounds is sufficient to cause the mud to exude from the openings 22c and to cover the tape. Thus far I have described how the tape is fed to the roller 17 and how the mud is applied onto the tape, the flow of mud being controlled by the valve 29. I will now describe how the tape can be cut after a groove 24 has been filled with the mud and covered with the tape.

Any tape cutting device may be used and I have shown the cutting mechanism D as including the tape guide 16 and the guide slidably carries a rack 30, see Figure 5. The rack has a knife 31 secured thereto and a pinion 32 meshes with the rack. Figure 3 shows the pinion 32 mounted on a shaft 33 which is journaled in bearings 33a and 33b. The end of the shaft 33 projecting beyond the bearing 33a is enlarged at 33c and provided with a bore 33d for receiving an end of a control shaft 34. The shaft 34 carries a pin 34a that rides in a helical groove 33e formed in the cup-shaped member 33c. A knob 34b is secured to the other end of the shaft 34 and a pull on the handle will cause the pin 34a to rotate the shaft 33 and pinion 32 through one complete revolution which will cause the rack to move the knife across the tape. After the cut has been made, the knob is moved longitudinally in a reverse direction for returning the knife to its starting position where it will be ready for another cut. The shaft 33 is supported by bearings 35 which in turn are carried by the neck 1. The shaft is made up of sections (not shown) of the same length as the sections A, B and C. When the device is changed in length, sections of the shaft may be removed or added as required. Any other mechanism for reciprocating the knife can be used if desired.

From the foregoing description of the various parts of the device, the operation thereof may be readily understood.

The operator grasps the device so that one hand supports the tube and neck at approximately the section B, and the other hand grasps the tube adjacent to the valve 29 where control of the flow of mud can be quickly regulated. The valve 29 is opened to the desired extent and the device is moved for causing the roller to travel along the groove. Where the wall board joining is not provided with a groove, the device is guided along the wall board joint. The roller will apply the mud coated tape to the groove in the manner illustrated in Figure 4. When looking at Figure 3, the tool is moved in the direction of the arrow "a" and this will cause the mud coated tape to lie flat in the groove 24. The layer of mud 23 does not completely fill the groove and this will cause the tape to be partially received in the groove. The second layer of mud, not shown, is applied by another tool and covers the tape and the groove to a depth where the outer surface of the second layer will form a slight crown, the side edges of the second layer merging into the wall board surface. It will be seen that one movement of the tool along the groove will cause the roller to simultaneously apply the mud and tape in the groove.

The pins 18 contact with the tape at spaced points and therefore any pressure of the pins against the tape will be quickly dissipated with the result that the roller will not squeeze any of the mud out from under the tape during the operation of the device. If the pins were not provided but instead a cylindrical roller were used, the pressure of the roller on the tape would tend to squeeze the mud out from under the tape and thus defeat the purpose of the invention. It is possible to mount discs on the roller to take the place of the pins and the discs are shown in Figure 3 by the broken circular line 18a. This will give three "line" contacts on the paper instead of point contacts. The pressure on these "lines" will be quickly dissipated and thus the mud will not be squeezed out from under the tape.

The second vital feature of the invention lies in the passing of the tape in contacting relation with the portion 22a of the nozzle. The mud issuing from the openings in this portion will moisten the tape and get it in readiness to receive the layer of mud. The curvature of the portion 22 of the nozzle causes it to gradually extend away from the tape so that the portion 22b will be at the desired distance from the ends of the pins. In this way the thickness of the layer of mud is determined. The mud will readily adhere to the tape because the tape has been previously moistened as it passes the portion 22a.

The shallowness of the nozzle interior 21 is designed to support the mud and prevent it from dropping to one side of the nozzle should the device be turned to dispose the roller axis in a vertical position when filling a horizontal groove or covering a horizontal joint with the mud and tape. The plasticity of the mud determines the height of the shallow portion 21. The roller 17 projects beyond the end of the nozzle in order that it can contact with the surface being covered with the mud and tape. I have found it advisable to cut the corners of the nozzle at angles of 45°, as shown at 20a in Figure 4, and also to make the ends of the roller 17 conical shaped as at 17a in order that the device will be adapted to apply mud and tape to an interior corner. After the tape has been applied to an interior corner, it is possible to use a broad knife to force the tape into the formation of a right angle. The tape is placed approximately in the proper position by the tool and is finished by hand.

It is necessary that the tape roll rotate freely and this is accomplished by the thrust bearings 8 and 9. The roll is held against lateral movement in the magazine even though the roll axis is moved into a vertical position. The result is that the tape will freely move through the neck 1 even though the device is used for filling a horizontal groove or joint rather than a vertical one. The magazine 5 is designed to be quickly opened and closed for the purpose of making a rapid change of tape rolls when a roll has been used. The mud in issuing from the nozzle will tend to rotate the roller 17 in a clockwise direction and this will aid in feeding the tape from the tape roll and make the tool easier to operate. The position and angle at which the mud strikes the tape while it is on the roller 17 is important. The device can be used for filling vertical as well as horizontal joints and also ceiling joints can be readily filled.

It is possible to apply the mud and tape to an outside corner joint by simply applying one half of the tape to one side of the outside corner with the tool and then using a broad knife to bend the tape over to cause it and the mud to adhere to the other side of the corner. The device saves the need of scaffolding when filling grooves or joints in a ceiling since the sectional neck and tube can be made long enough to permit an operator to stand on the floor and readily reach the ceiling for filling the groove and applying the tape therein. The tape cutting knife can be operated from a point on the tool readily accessible to the operator and this makes the device easy to operate.

It is to be understood that any type of roller 17 that will apply the tape in proper position to cover a joint without squeezing mud from behind the tape, falls within the scope of the present invention.

I claim:

1. A combined plastic and tape applicator comprising a tape feeding mechanism including a roller having pins on its periphery for applying tape to a surface, and mud feeding means including a nozzle for applying mud to the back of the tape just prior to the tape and mud being applied to the surface, whereby the roller will cause the mud to contact with the surface and to be covered by the tape.

2. A combined plastic and tape applicator comprising a tape feeding mechanism including a roller having pins on its periphery for applying tape to a surface, and mud feeding means including a nozzle for applying mud to the back of the tape just prior to the tape and mud being applied to the surface, whereby the roller will cause the mud to contact with the surface and to be covered by the tape, the pins being spaced apart for contacting with the tape at spaced points so as to cut down on the actual roller area contacting with the tape at the time it and the mud are being applied to the surface and thus prevent the mud from being squeezed out from under the tape at the moment of application.

3. In a plastic and tape applicator, a roller having pins on its periphery for applying a tape to a surface, and a nozzle for delivering mud onto the tape in a direction tending to rotate the roller for feeding tape from the applicator.

4. In a plastic and tape applicator, a roller having pins on its periphery for applying a tape to a surface, and a nozzle for delivering mud onto the tape in a direction tending to rotate the roller for feeding tape from the applicator, said nozzle having a portion contacting with the tape for causing the mud issuing from the nozzle to initially moisten the tape, the remaining portion of the nozzle being spaced from the tape a distance corresponding to the thickness of the layer of mud desired to be applied to the tape.

5. In a plastic and tape applicator, a roller having pins on its periphery for applying a tape to a surface, and a nozzle for delivering mud onto the tape in a direction tending to rotate the roller for feeding tape from the applicator, the back of the nozzle having a marker for indicating the center of the tape, this marker being adapted to follow a line on a surface to which the tape and mud are being applied and to cause the line to bisect the mud.

6. A combined plastic and tape applicator comprising a tape feeding mechanism including a magazine for the tape and a roller spaced a considerably distance from the magazine and having spaced pins in its periphery for removing tape from the magazine and applying it to a surface as needed, means for feeding mud to the back of the tape and including a nozzle disposed adjacent to the roller for applying the mud to the tape as the tape passes around the roller, the roller applying both mud and tape to the surface, and cutting means for severing the tape.

7. A combined plastic and tape applicator comprising a tape feeding mechanism including a magazine for tape, an elongated neck for receiving tape from the magazine, a roller spaced a considerable distance from the magazine and receiving the tape from the neck and having pins contacting with the tape for feeding it onto a surface; a mud feeding means including a mud conveying tube extending along the neck and having a valve positioned near the magazine and a mud ejecting nozzle adjacent to the roller, the mud issuing from the nozzle when the valve is opened and being applied to the back of the tape in a direction to aid in rotating the roller for feeding tape from the magazine; and tape cutting means including a knife movable transversely across the tape for cutting it near the roller, and knife actuating means positioned near the magazine for operation by the same hand of the operator that actuates the valve.

8. In a device of the type described, an elongated narrow neck for carrying tape, a tape holding magazine arranged at one end of the neck for feeding tape thereinto, means for feeding mud to the back of the tape, and a tape cutting means disposed near the other end of the neck and including a rack slidable transversely with respect to the tape, a knife carried by the rack and adapted to sever the tape prior to the place where the tape receives the mud, a pinion meshing with the rack, an elongated shaft for the pinion and extending the neck, and an actuating handle for the shaft and positioned near the magazine.

9. A combined plastic and tape applicator comprising an elongated neck for carrying tape, an elongated narrow tube for carrying mud, said neck and tube being secured together and formed in sections, whereby the overall length of neck and tube can be varied, a tape magazine disposed at one end of the neck, said tube having a valve disposed near the magazine, the other end of the tube having a nozzle, a tape applying roller arranged adjacent to the nozzle for causing the tape to move by the nozzle and receive a layer of mud when the valve is open, and a knife for cutting the tape.

10. A combined plastic and tape applicator comprising a tape feeding magazine adapted to receive a roll of tape, bearings carried by the magazine for rotatably supporting the roll of tape and for preventing lateral movement of the roll in the magazine regardless of the position of the magazine, a roller for applying the tape to a surface, a mud delivering nozzle associated with the roller for applying mud to the back of the tape, the width of the nozzle adjacent to the roller having a shallow interior for supporting the mud across the entire nozzle width even when the nozzle is turned so that its width extends substantially in a vertical direction.

11. In combination, a tape feeding mechanism including a mud feeding nozzle and means for carrying the tape past the nozzle for receiving a layer of mud on the backside of the tape, said means also being adapted to apply the tape with the mud to a surface.

12. In combination, a tape feeding mechanism including a mud feeding nozzle and means for carrying the tape past the nozzle for receiving a layer of mud on the backside of the tape, said means also being adapted to apply the tape with the mud to a surface, and means for severing the tape at a point in advance of where the tape receives the mud.

13. In a device of the type described, a tape feeding mechanism including a mud feeding nozzle, and means for guiding the tape into contact with the nozzle for causing the mud to initially moisten the tape, said means also causing the tape to gradually diverge from its contacting position with the nozzle to receive mud from the nozzle, the space between the tape and nozzle at the end of the nozzle determining the thickness of the layer of mud on the tape.

14. In a device of the type described, a tape feeding mechanism including a mud feeding nozzle and a roller for guiding the tape adjacent to the nozzle, said nozzle directing the mud issuing therefrom against the tape for aiding in moving the tape and rotating the roller for feeding the tape from the tape feeding mechanism.

15. In a device of the type described, a roller for guiding tape onto a plastic material, and spaced tape-contacting means carried by the roller for contacting with a tape at spaced places for applying sufficient pressure on the tape at spaced points to cause the tape to adhere to the plastic material, the spaced pressure points preventing the formation of a line of continuous pressure contact being applied to the tape to force the plastic material out from the edges of the tape.

16. A combined plastic and tape applicator comprising a tape feeding mechanism including a roller having spaced tape-contacting means for applying tape to a surface, and mud feeding means including a nozzle for applying mud to the back of the tape just prior to the tape and mud being applied to the surface, whereby the roller will cause the mud to contact with the surface and to be covered by the tape without squeezing the mud out from under the tape during the application of the mud and tape to the surface.

17. A combined plastic and tape applicator comprising a tape feeding mechanism including a roller having spaced tape-contacting means for applying tape to a surface, and mud feeding means including a nozzle for applying mud to the back of the tape just prior to the tape and mud being applied to the surface, whereby the roller will cause the mud to contact with the surface and to be covered by the tape, the spaced tape-contacting means contacting with the tape at spaced points so as to reduce and space apart the actual roller contacting areas pressing against the tape at the time it and the mud are being applied to the surface and thus prevent the mud from being squeezed out from under the tape at the moment of application.

18. In a plastic and tape applicator, a roller having spaced tape-contacting means for applying a tape to a surface, and a nozzle for delivering mud onto the tape in a direction tending to rotate the roller for feeding tape from the applicator.

19. In a plastic and tape applicator, a roller having spaced tape-contacting means for applying a tape to a surface, and a nozzle for delivering mud onto the tape in a direction tending to rotate the roller for feeding tape from the applicator, said nozzle having a portion contacting with the tape for causing the mud issuing from the nozzle to initially moisten the tape, the remaining portion of the nozzle being spaced from the tape a distance corresponding to the thickness of the layer of mud desired to be applied to the tape.

20. In a plastic and tape applicator, a roller having spaced tape-contacting means for applying a tape to a surface, and a nozzle for delivering mud onto the tape in a direction tending to rotate the roller for feeding tape from the applicator, the back of the nozzle having a marker for indicating the center of the tape, this marker being adapted to follow a line on a surface to which the tape and mud are being applied and to cause the line to bisect the mud.

21. A combined plastic and tape applicator comprising a tape feeding mechanism including a magazine for the tape and a roller spaced a considerable distance away from the magazine and having spaced tape-contacting means for removing tape from the magazine and applying it to a surface as needed, means for feeding mud to the back of the tape and including a nozzle disposed adjacent to the roller for applying the mud to the tape as the tape passes around the roller, the roller applying both mud and tape to the surface, and cutting means for severing the tape.

22. A combined plastic and tape applicator comprising a tape feeding mechanism including a magazine for tape, an elongated neck for receiving tape from the magazine, a roller spaced a considerable distance away from the magazine and receiving the tape from the neck and having spaced tape-contacting means for feeding it onto a surface; a mud feeding means including a mud conveying tube extending along the neck and having a valve positioned near the magazine and a mud ejecting nozzle adjacent to the roller, the mud issuing from the nozzle when the valve is opened and being applied to the back of the tape in a direction to aid in rotating the roller for feeding tape from the magazine; and tape cutting means including a knife movable transversely across the tape for cutting it near the roller, and knife actuating means positioned near the magazine for operation by the same hand of the operator that actuates the valve.

23. A combined plastic and tape applicator comprising an elongated neck for carrying tape, an elongated tube for carrying mud, said neck and tube being secured together, a tape magazine disposed at one end of the neck, a valve for the tube, the outlet end of the tube having a nozzle, a tape applying means arranged adjacent to the nozzle for causing the tape to move by the nozzle and receive a layer of mud when the valve is open, and a knife for cutting the tape.

ROBERT G. AMES.